United States Patent
Brukman (12)

(10) Patent No.: US 10,356,548 B2
(45) Date of Patent: Jul. 16, 2019

(54) SYSTEM AND METHOD FOR IMPROVED PASSENGER BOARDING

(71) Applicant: PASSUR Aerospace, Inc., Stamford, CT (US)

(72) Inventor: David Brukman, Stamford, CT (US)

(73) Assignee: PASSUR Aerospace, Inc., Stamford, CT (US)

( * ) Notice: Subject to any disclaimer, the term of this patent is extended or adjusted under 35 U.S.C. 154(b) by 104 days.

(21) Appl. No.: 15/373,705

(22) Filed: Dec. 9, 2016

(65) Prior Publication Data

US 2018/0167765 A1    Jun. 14, 2018

(51) Int. Cl.
*H04W 4/02* (2018.01)
*H04L 29/08* (2006.01)
*H04W 76/10* (2018.01)

(52) U.S. Cl.
CPC ............. *H04W 4/02* (2013.01); *H04L 67/12* (2013.01); *H04L 67/26* (2013.01); *H04W 76/10* (2018.02)

(58) Field of Classification Search
CPC ................................ H04W 4/02; H04L 67/26
See application file for complete search history.

(56) References Cited

U.S. PATENT DOCUMENTS

2007/0043598 A1* 2/2007 Bertram ............... G06Q 10/02
705/5

* cited by examiner

*Primary Examiner* — Eli Hadji M Sall
(74) *Attorney, Agent, or Firm* — Fay Kaplun & Marcin, LLP

(57) ABSTRACT

A method for receiving boarding information from a plurality of passengers and a transit staff, calculating an arrival time to request each of the plurality of passengers to arrive at a boarding gate, where the arrival time is based on the boarding information. The method further includes transmitting a message to a user terminal associated with each passenger, where the message includes the arrival time.

21 Claims, 7 Drawing Sheets

System -- 100

SYSTEM AND METHOD FOR IMPROVED PASSENGER BOARDING

BACKGROUND

The time it takes passengers to board an aircraft can cause problems for all parties involved, including the passengers and the airport/airline staff. The boarding process is often tedious and slow, and airlines have failed to effectively streamline the process in an efficient manner. Conventional boarding methods provide no direct and real-time passenger communication during the boarding process. Often, this can result in overcrowding at areas around the gate, the boarding bridge, and the plane during boarding. Conventional boarding provides generalized arrival times for an entire flight to arrive at the gate. Passengers must arrive excessively early because they are not provided an exact and efficient time to arrive. Spending long periods waiting at a crowded gate can increase a passenger's chance of missing their flight when they are called. This can be exacerbated by problems such as such as noise, passenger hearing challenges, and passenger language skills.

SUMMARY OF THE INVENTION

A method for receiving boarding information from a plurality of passengers and a transit staff, calculating an arrival time to request each of the plurality of passengers to arrive at a boarding gate, where the arrival time is based on the boarding information. The method further includes transmitting a message to a user terminal associated with each passenger, where the message includes the arrival time.

A system having a boarding manager device, where the boarding manager device receives boarding information from a plurality of passengers and a transit staff. The board manager device further calculates an arrival time to request each of the plurality of passengers to arrive at a boarding gate, where the arrival time is based on the boarding information. The board manager device further transmits a message to a user terminal associated with each passenger, where the message includes the arrival time.

A method for receiving boarding information from a user and transmitting the boarding information to a boarding manager device. Where the boarding manager device calculates an arrival time to request a plurality of passengers to arrive at a boarding gate, and where the plurality of passengers includes the user. Where the arrival time is based on boarding information obtained from the plurality of passengers. The method further includes receiving a message from the boarding manager device, where the message includes the arrival time for the user.

DETAILED DESCRIPTION

Figure 1:
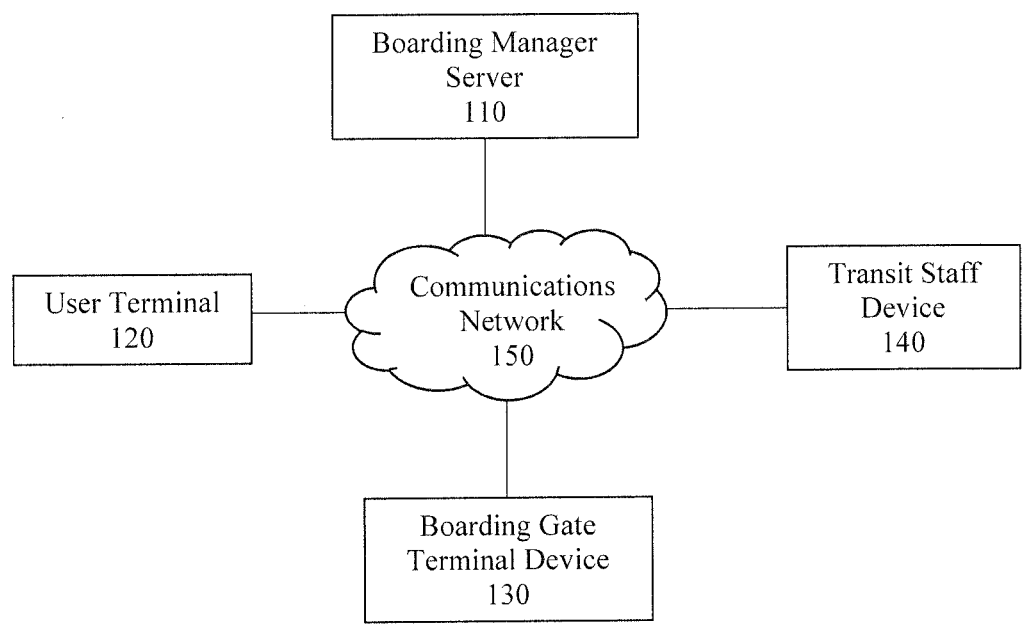
FIG. 1 shows an exemplary embodiment of a system for improved boarding of an aircraft through the use of a boarding manager.

The exemplary embodiments may be further understood with reference to the following description and to the appended drawings, wherein like elements are referred to with the same reference numerals. The exemplary embodiments relate to an improved boarding process using user terminals (e.g., mobile devices), carried by departing passengers. Passengers may receive a display of the time they need to be at the boarding gate, wherein the time is specific to the individual passenger (as opposed to every passenger receiving the same arrival time). The passenger may receive a continuous display of the time they have remaining, as well as alerts at various time horizons. Optionally, the displayed time and alerts may be adapted for the passenger's specific location in relation to the gate. The displayed time may take into account the time it takes the passenger to walk (or be assisted, if appropriate) to the gate.

The exemplary embodiments allow passengers to more efficiently manage their time because they will know exactly when to show up at the gate. The exemplary embodiments will result in less crowding around the gate, in the boarding bridge, and on the plane during boarding. A passenger will have a decreased risk of missing their flight due to a misunderstanding of gate agent instructions because crowds will be reduced, wait times will be shorter, and passengers may be directly updated and alerted. The exemplary embodiments will result in an orderly boarding process that may improve on-time departure and turn time metrics for airlines. Additionally, the exemplary embodiments allow airlines to try different boarding schemes dynamically, with minimum customer impact or staff training required.

FIG. 1 shows an exemplary system 100 for improved boarding of an aircraft through the use of a boarding manager server 110. The boarding manager server 110 may be located onsite at a transit location (e.g., in a computer located at an airport), offsite from a transit location (e.g., in a data center), in a "cloud" environment, or in any location with appropriate connectivity.

The system 100 also includes a user terminal 120 which may be associated with a passenger. The user terminal 120 may represent any electronic device utilized by a passenger that is configured to receive outputs from the communications network 150. The user terminal 120 may include the necessary hardware, software, and/or firmware to perform the various operations associated with, for example, receiving outputs, displaying the outputs, and establishing a connection with the communications network 150.

The system 100 also includes a boarding gate terminal device 130, which may be located in the vicinity of the boarding gate and may be staffed by a transit staff employee (e.g., an airline employee working at the departure gate). The boarding gate terminal device 130 may be any device capable of communicating with the boarding manager server 110 and may include a display and a user input. For example, the boarding gate terminal device 130 may be a desktop computer or a portable computing device.

The system 100 also includes a transit staff device 140 that is capable of communicating with the boarding manager server 110. For example, the communication may be direct (e.g., when the boarding manager server 110 is located onsite), or indirect (e.g., when the boarding manager is located offsite). Transit staff who have access to the device may include staff at a transport hub (e.g., an airport), a designated operator of the system 100, or vendor staff. The transit staff device 130 may receive information entered manually from the transit staff, for example when a transit staff employee manually enters information into the device. Additionally, the transit staff device 130 may receive information from an automated system. For example, information for a scheduled flight may be programmed to be automatically sent to the boarding manager server 110 without any human interaction.

The system 100 also includes a communications network 150 configured to connect the various components of the system 100. The communications network 150 may represent any single or plurality of networks used by the components of the system 100 to communicate with one another. For example, if the airport boarding manager server 110 is used at an airport, the communications network 150 may include a private network in which the boarding manager server 110 may initially connect. The private network may connect to a network of an Internet Service Provider to connect to the Internet. Subsequently, through the Internet, a connection may be established to other electronic devices. It should be noted that the communications network 150 and all networks that may be included therein may be any type of network. For example, the communications network 150 may be a local area network (LAN), a wide area network (WAN), a virtual LAN (VLAN), a Wi-Fi network, a HotSpot, a cellular network (e.g., 3G, 4G, Long Term Evolution (LTE), etc.), a cloud network, a wired form of these networks, a wireless form of these networks, a combined wired/wireless form of these networks, etc.

Figure 2:
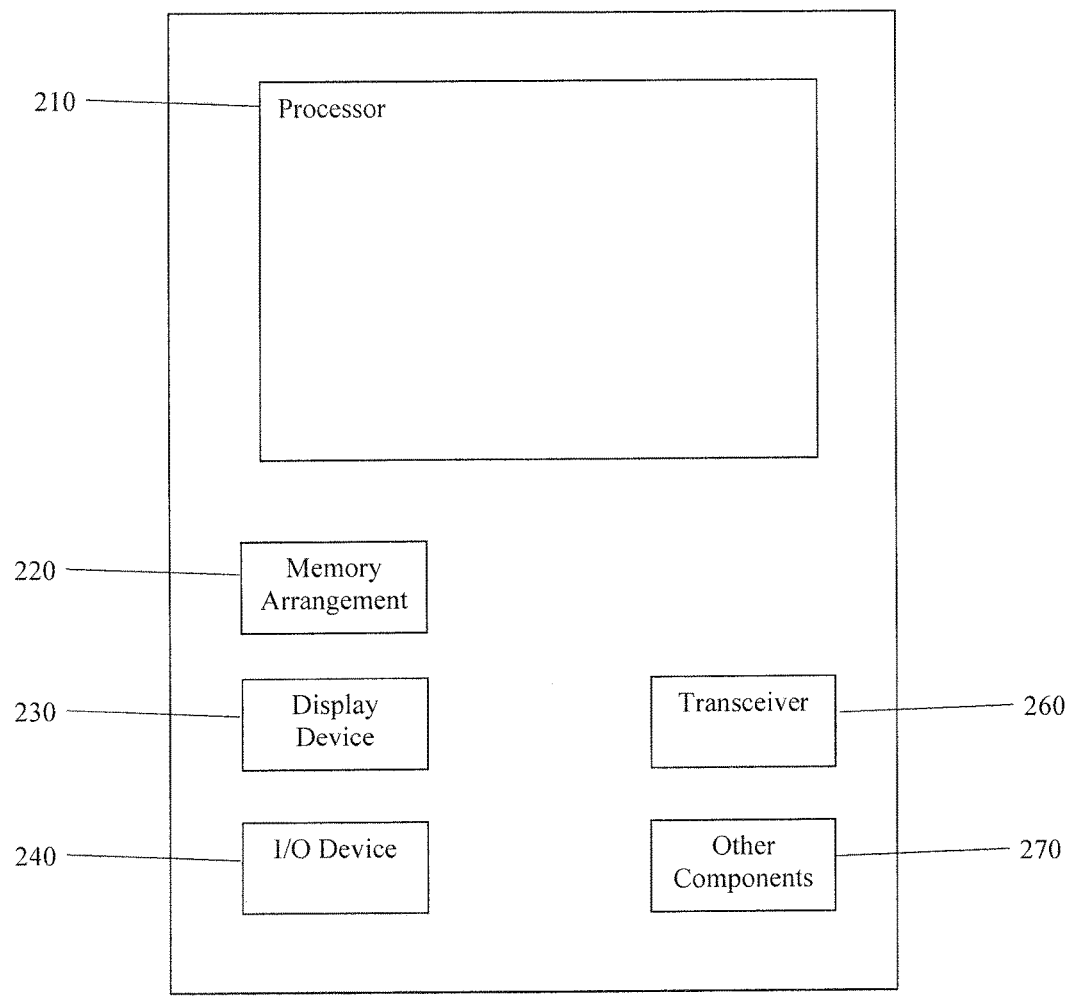
FIG. 2 shows an exemplary embodiment of a boarding manager server.

FIG. 2 shows the boarding manager server 110 of FIG. 1 according to the exemplary embodiments. Although the boarding manager server 110 is described as a network component (e.g., a server), the boarding manager server 110 may be embodied in a variety of ways such as a stationary device (e.g., a desktop terminal). The boarding manager server 110 may include a processor 210, a memory arrangement 220, a display device 230, an input and output (I/O) device 240, a transceiver 260, and other components 270 (e.g., an imager, an audio I/O device, a battery, a data acquisition device, ports to electrically connect to other electronic devices, etc.). The memory arrangement 220 may be a hardware component configured to store data related to operations performed by the boarding manager server 110. The transceiver 260 may be a hardware component configured to transmit and/or receive data via the communications network 150.

Figure 3:
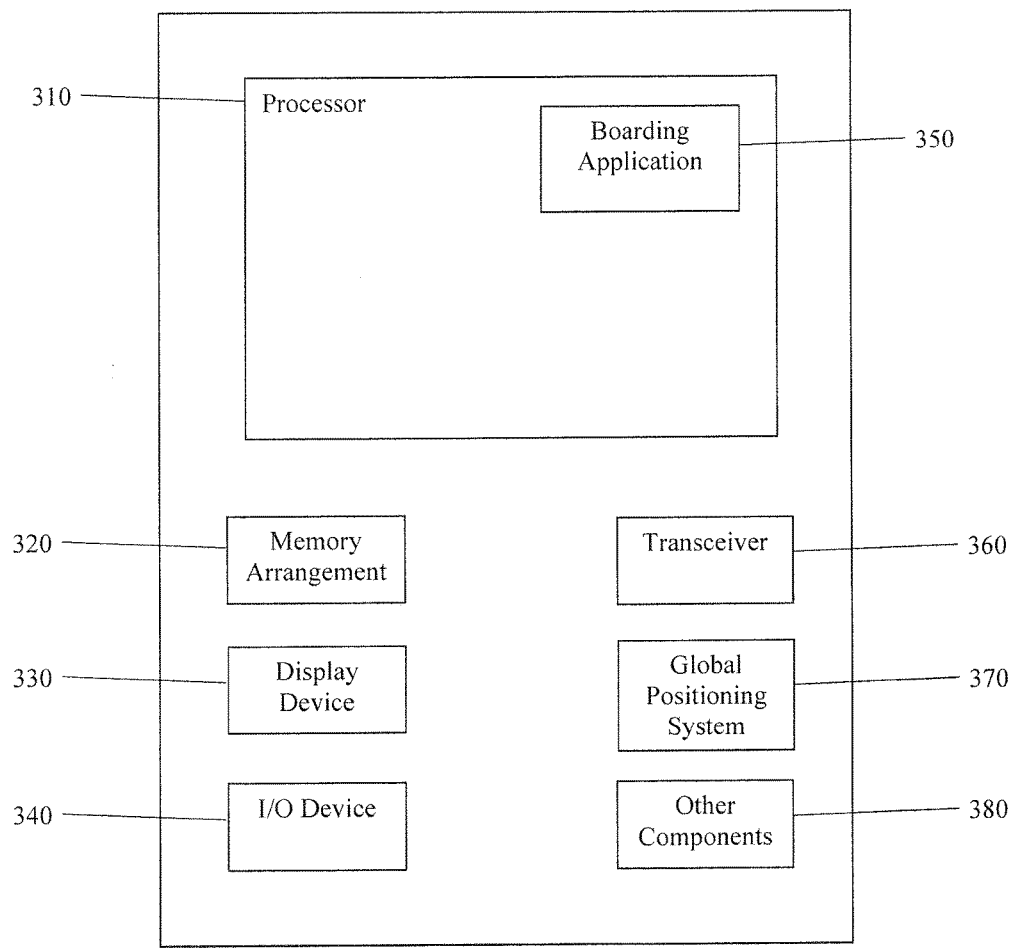
FIG. 3 shows an exemplary embodiment of a user terminal.

FIG. 3 shows the user terminal 120 of FIG. 1 according to the exemplary embodiments. The user terminal 120 may be embodied in a variety of ways such as a portable device (e.g., a tablet, a smartphone, a laptop, etc.). The user terminal 120 may include a processor 310, a memory arrangement 320, a display device 330, an input and output (I/O) device 340, a transceiver 360, a global positioning system 370, and other components 380 (e.g., an imager, an audio I/O device, a battery, a data acquisition device, ports to electrically connect the user terminal 120 to other electronic devices, etc.).

The processor 310 may be configured to execute a plurality of applications of the user terminal 120. Specifically, the processor 205 may execute a boarding application 350. It should be noted that the above noted boarding application 350, being an application (e.g., a program) executed by the processor 205 is only exemplary. The functionality associated with the boarding application 350 may also be represented as components of one or more multifunctional programs or may be a modular component coupled to the boarding manager server 110, e.g., an integrated circuit with or without firmware.

The memory 320 may be a hardware component configured to store data. Specifically, the memory 310 may store data related to the operations of the boarding application 350 including received data from the boarding manager server 110. The display device 330 may be a hardware component configured to show data to a user while the I/O device 340 may be a hardware component that enables the user to enter inputs. For example, a user passenger of the user terminal 120 may input information through a user interfaces shown on the display device 330 with inputs entered with the I/O device 340. It should be noted that the display device 330 and the I/O device 340 may be separate components or integrated together such as a touchscreen. The transceiver 260 may be a hardware component configured to transmit and/or receive data via the communications network 150. The global positioning system 370 may provide information of the location of the user terminal 120. The positioning system may function via satellite technology, Wi-Fi technology, or any other technology capable of providing location information.

Figure 4:
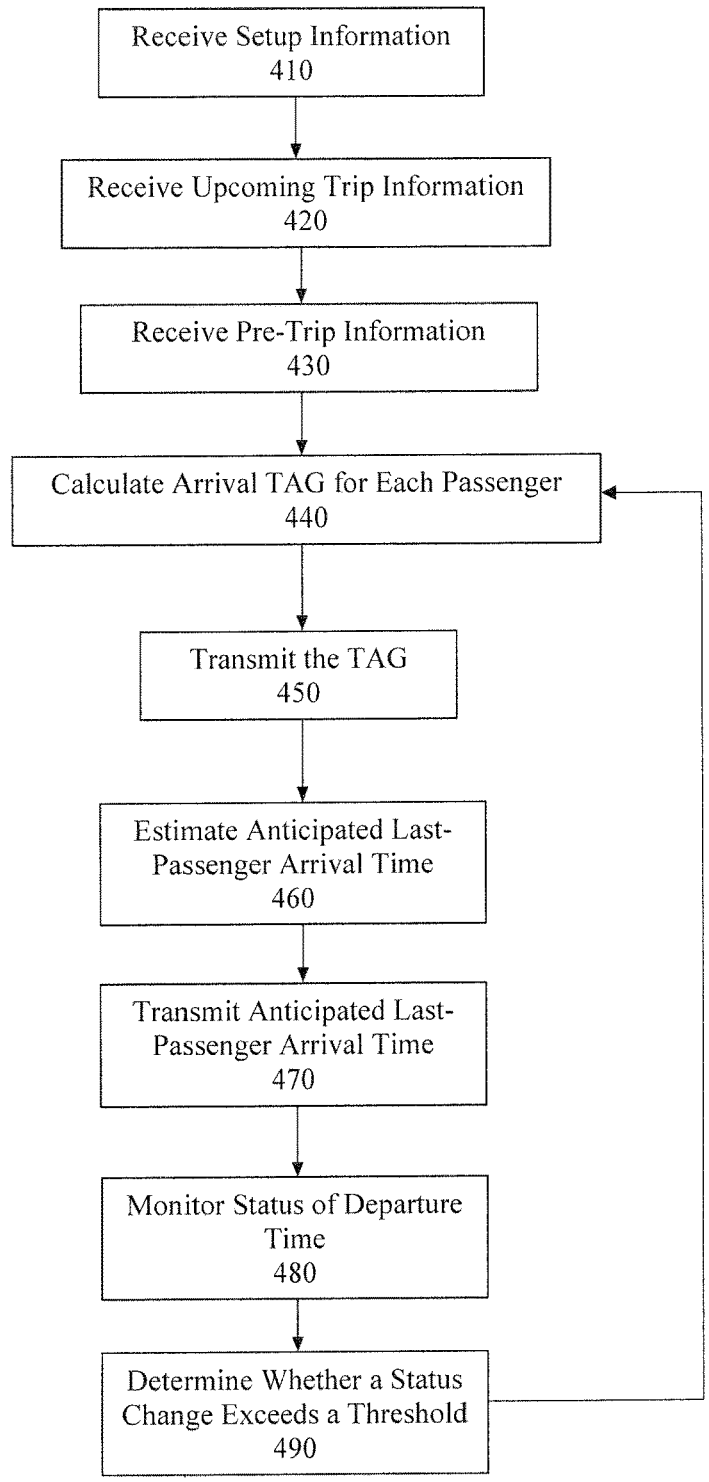
FIG. 4 shows an exemplary method for assigning individual passenger boarding times.

FIG. 4 shows a method for assigning individual passenger boarding times using the system 100. In step 410, the boarding manager server 110 receives setup information from transit staff device 140 and transit passengers (e.g., via the user terminal 120). The setup information received from the transit staff device 140 may include the location of the gate boarding area for each gate used by a participating transit service company (e.g., an airline). The setup information may further include the designation of polygons and waypoints covering the transit hub terminals, which may be used to estimate a passenger's walking time to arrive at a boarding area. The polygons and waypoints may be used to calculate distance for a passenger in the terminal to the gate boarding area. The setup information may further include the designation of waypoint pairs with specially assigned travel times. Such pairs may include security points (e.g., just before security to right after security), and bus/train connections between different terminals.

The setup information received from the transit passengers may include information obtained through a passenger's user terminal 120. Through the user terminal 120, a passenger may register with the system, during which their identity may be verified by the transit service company. Optionally, the registration may be generic, as opposed to being specific to a particular transit service company. If generic, a single registration by the passenger may allow them to use the system 100 while using any available transit service company. The setup information from the transit passengers may additionally include a status associated with the registered passenger. A status may indicate that boarding assistance is required. A status may also specify that the passenger has a walking impediment.

Once registered, a passenger's identity may be permanently associated with their user terminal 120 in a database within the user terminal 120. The passenger's identity may also be permanently associated with their user terminal 120 in a database within a transit service company's database, which may be subsequently queried by a passenger's user terminal 120. As an optional embodiment, the identity of each passenger in the transit service company's database may be masked. The transit service company may identify each passenger with a unique identifier rather than a name. Thus, potentially sensitive information, such as customer names, will not need to be stored.

In step 420, the boarding manager server 110 receives upcoming trip information from transit staff device 140 and transit passengers. The upcoming trip information received from the transit staff device 140 may inform the system that a trip (e.g., a flight) is upcoming, and may be received any time after a trip is either scheduled, or anticipated to be scheduled. The transit staff device 140 may receive the data manually (e.g., from a human operator), or automatically (e.g., from another system).

The upcoming trip information received from trip passengers may include information obtained through a passenger's user terminal 120. The upcoming trip information may be received after a passenger has reserved a trip and been issued a boarding pass by a transit service company. Alternatively, the upcoming trip information may be received from the boarding gate terminal device 130 or transit staff device 140 (e.g., an airline employee may indicate a passenger has been issued a boarding pass). Through the user terminal 120, a passenger may register their issued boarding pass for an upcoming trip. The upcoming trip information may also include an indication of required boarding assistance and/or a walking impediment for the upcoming trip. The upcoming trip information may further include information for additional trip passengers that are not registered on their own user terminal 140 (e.g., children).

In step 430, prior to the trip (e.g., a few hours or days before the scheduled departure), the boarding manager server 110 receives pre-trip information from the boarding gate terminal device 130. The pre-trip information may include a message with a list of passengers. The list may be arranged by the order of boarding for each passenger, or by priority groups. There are a number of approaches that may be used to determine the order. For example, the order may be arranged first by a priority, and then by seating in the rear of the transit vehicle first. Alternatively, seats with windows may be first, followed by middle and then aisle seats. Optionally the boarding manager server 110 may apply seating arrangements using several predefined schemers, honoring the priority of each passenger.

The pre-trip information may include an estimated transit vehicle departure time and an estimated start of boarding time. Alternatively, the boarding gate terminal device 130 may send a typical time to board a passenger at the gate. When the boarding manager server 110 does not receive an estimated or typical boarding time, the boarding manager server 110 may access a historical database to derive an appropriate time. When the list of passengers includes a passenger that requires extra assistance, the boarding manager server 110 may adjust the start of boarding time accordingly.

In step 440, the boarding manager server 110 calculates an arrival time at gate (TAG) for each passenger. The TAG is the time at which the boarding manager server 110 will request each passenger to arrive at the gate. The TAG calculation may begin with the calculation of a proposed boarding time (PBT) for each passenger. For each individual passenger, the PBT may be based on the estimated time to board passengers on the list that will board prior to the individual passenger (based on the previously determined order) and the previously determined start of boarding time. The TAG may be calculated as the PBT minus a predefined constant. The predefined constant may be a time provided by the transit service company (e.g., an airline may want passengers to arrive at the gate 2 minutes prior to their PBT).

In step 450, the boarding manager server 110 transmits the TAG to each passenger with a registered user terminal 120. If a passenger has a user terminal with additional passengers scheduled for the trip (e.g., children), the boarding manager server 110 may transmit the earliest TAG for all of the passengers in the group.

In step 460, the boarding manager server 110 will estimate the anticipated last-passenger arrival time. In step 470, the boarding manager server 110 will transmit the estimated anticipated last-passenger arrival time to the boarding gate terminal device 130.

In step 480, the boarding manager server 110 monitors the status of the estimated transit vehicle departure time. The status of the departure time may change for a variety of reasons. For example, the transit vehicle could be delayed in arriving at the gate, the transit vehicle may encounter a maintenance issue that requires repair, or there may be dangerous weather along the projected travel path. In step 490, the boarding manager determines whether the estimated departure time has changed, and whether the change exceeds a predetermined threshold (e.g., 5 minutes). When the change exceeds the predetermined threshold, the method reverts back to step 440 and uses the altered estimated transit vehicle departure time as input. In an additional embodiment, the boarding manager may additionally transmit a message to the passenger user terminals 120 to inform the passengers of the cause the delay.

In an optional embodiment, the boarding manager may wait a period of time after a time change before returning to step 440. For example, the boarding manager may wait 15 minutes after the estimated transit vehicle time change exceeds the threshold to determine whether any additional changes occur. The waiting period prevents the user from receiving an excessive amount of arrival time changes in a short period of time.

It is noted the departure time change may occur prior to, or during boarding. When the change occurs during boarding, the method is only performed for passengers that have not already arrived at the boarding gate. The boarding manager may maintain a record of arrived passengers by means of embodiments described below regarding an awaiting arrival list.

Figure 5:
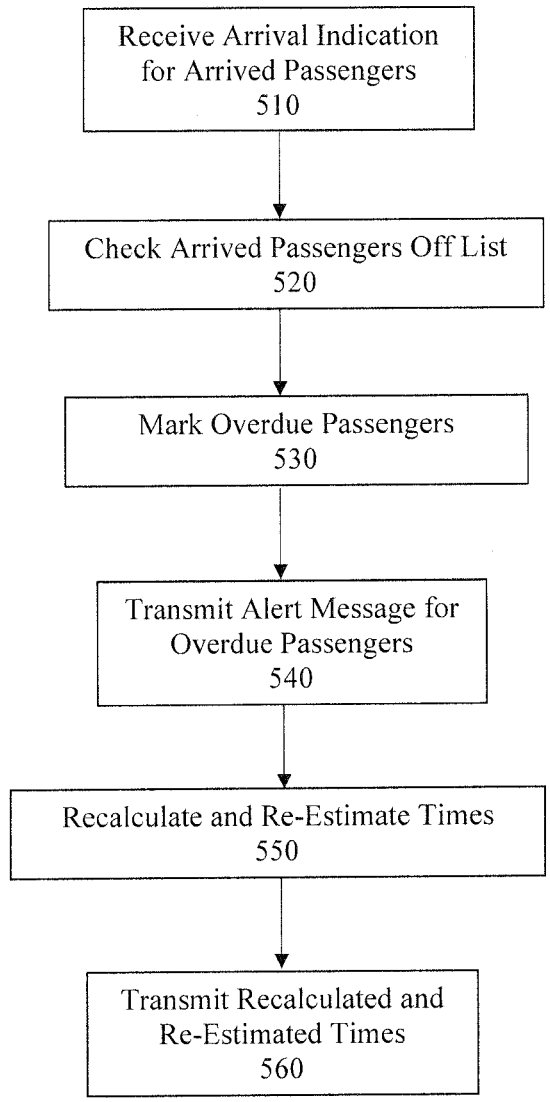
FIG. 5 shows an exemplary method for notifying late passengers, recalculating arrival times, and re-estimating last-passenger arrival times.

FIG. 5 shows a method for sending late passenger alerts, recalculating the passenger arrival times, and re-estimating the last-passenger arrival time. In step 510, the boarding manager server 110 receives an indication from the boarding gate terminal device 130 when a passenger physically arrives at the boarding gate. For example, a transit staff employee may scan a passenger into the boarding gate terminal device 130, which may transmit the passenger's information to the boarding manager server 110. In step 520, when the boarding manager server 110 receives the arrival indication, it checks the passenger off an awaiting arrival list.

In step 530, immediately after an individual passenger's requested TAG has passed, the boarding manager server 110 determines whether the individual passenger remains on the awaiting arrival list. The boarding manager server 110 marks these passengers (i.e., the passengers that remain on the awaiting arrivals list after their TAG) as "overdue."

In step 540, when a passenger is marked as "overdue," the boarding manager server 110 transmits an alert to the user terminal 120 associated with the overdue passenger. In addition, the boarding manager server 110 may also send an alert message to the boarding gate terminal device 130.

In step 550, the boarding manager server 110 recalculates the TAG for all remaining passengers on the awaiting arrivals list. The recalculation includes information on the number of passengers that have been checked off the awaiting arrivals list, and the number of passengers that have been marked as overdue. Additionally, in step 550, the boarding manager re-estimates the anticipated last-passenger arrival time. The re-estimation includes information on the number of passengers that have been checked off the awaiting arrivals list, and the number of passengers that have been marked as overdue.

In step 560, the boarding manager server 110 transmits the recalculated TAG to the user terminals 120 associated with the remaining passengers. Additionally, in step 560, the boarding manager server 110 transmits the re-estimated anticipated last-passenger arrival time to the boarding gate terminal device 130.

Figure 6:
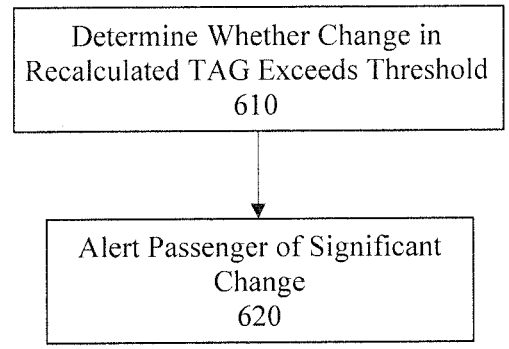
FIG. 6 shows an exemplary method for alerting passengers of a significant change in their requested arrival time.

FIG. 6 shows a method for alerting passengers of a significant change in their TAG. In step 610, the boarding manager server 110 determines whether the change in the passenger's recalculated TAG exceeds a predetermined threshold (e.g., 3 minutes). When the predetermined threshold is exceeded, the method proceeds to step 420. In step 620, the boarding manager server 110 transmits a message to the passenger's user terminal 120 to alert the passenger of the significant change in their requested TAG.

Figure 7:
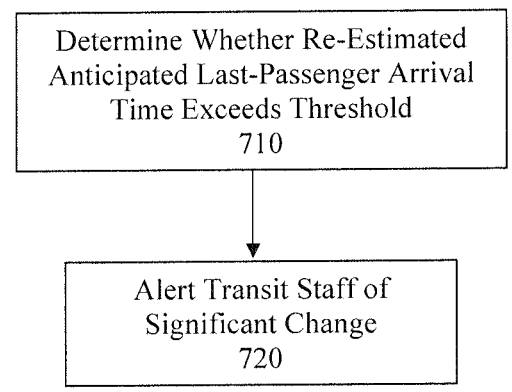
FIG. 7 shows an exemplary method for alerting transit staff of a significant change in the last-passenger arrival time.

FIG. 7 shows a method for alerting the transit staff device 140 of a significant change in the last-passenger arrival time. In step 710, the boarding manager server 110 determines whether the re-estimated last-passenger arrival time exceeds a predetermined threshold. When the predetermined threshold is exceeded, the method proceeds to step 720. In step 720, the boarding manager server 110 transmits a message to the boarding gate terminal device 130 to alert the transit staff located at the boarding gate of the significant change.

Figure 8:
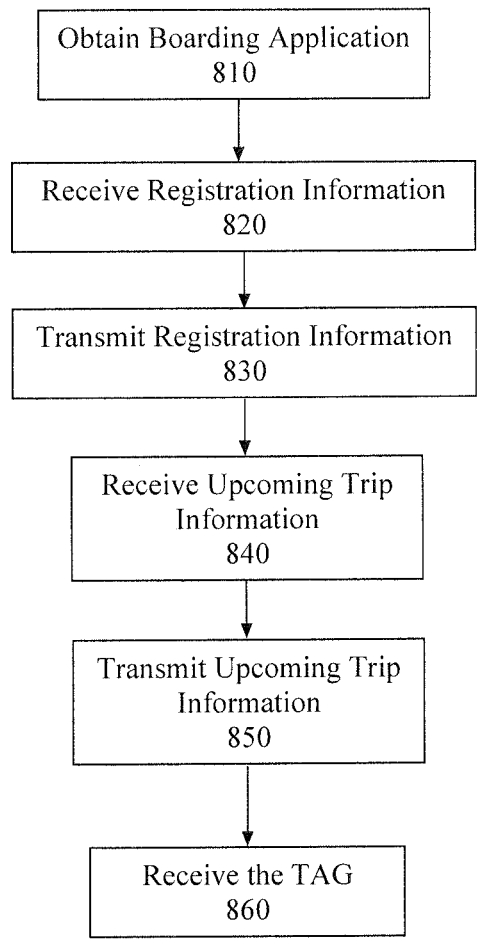
FIG. 8 shows an exemplary method for receiving individual passenger boarding times via the user terminal.

FIG. 8 shows a method for receiving individual passenger boarding times via the user terminal 120. In step 810, the user terminal 120 receives an indication from a user passenger to download and install and the boarding application 350 onto the user terminal 120. In response, the user terminal 120 downloads and installs the user boarding application. Optionally, the user terminal 120 may have the boarding application 350 preinstalled. Alternatively, the user terminal 120 may not install the boarding application 350, and instead may access the boarding application 350 through the use of another application. For example, a user may use an internet browsing application on the user terminal 120 to access the boarding application 350 without downloading or installing the application to the user terminal 120.

In step 820, the user terminal 120 receives the registration information from the user passenger. In step 830, the user terminal transmits the registration to the boarding manager server 110. The registration information may include the passenger's name and their status. Their status may indicate that boarding assistance is required or that that they have a walking impediment. Optionally, the registration information may be stored in a database within the memory arrangement 320.

In step 840, the user terminal 120 receives upcoming trip information from the user passenger. In step 850, the user terminal 120 transmits the upcoming trip information to the boarding manager server 110. The upcoming trip information may include information about an upcoming trip (e.g., a flight), such as information obtained from an issued boarding pass. Alternatively, the user terminal might receive upcoming trip information from the boarding manager server, for example, when the user passenger books a trip and the transit staff device 140 informs the boarding service manager 110.

In step 860, prior to the trip (e.g., a few hours or days before the scheduled departure), the user terminal 120 receives the TAG for the user passenger. The user terminal 120 may additionally receive an updated TAG when the boarding manager server 110 has determined that a change in the TAG has exceeded a predetermined threshold. Optionally, the user terminal 120 may receive a message that informs the user passenger of the cause of the change.

In an additional embodiment, the system 100 may estimate the number of passengers in the process of boarding (e.g., in the boarding bridge). The boarding manager server 110 may receive a message from the user terminal 120 of the service set identifier (SSID) and basic service set identifier (BSSID) of Wi-Fi networks it encounters. When a Wi-Fi network within the transit vehicle (e.g., airplane) has been encountered, the boarding manager server 110 may treat the encounter as the passenger's entry into the transit vehicle. Note that the user terminal 120 does not need to actually connect with the transit vehicle network, it only needs to encounter the network. Next, the boarding manager server 110 may calculate the time from the passenger arrival at the gate entrance (e.g., the time of the scan at the boarding gate terminal) until the entry into the transit vehicle. Then, the boarding manager server 110 may estimate the number of passengers in the process of boarding (e.g., in the bridge). When the number of passengers in the process of boarding exceeds a threshold (e.g., 20 passengers), the boarding manager server 110 may increase the requested TAG for subsequent passengers. Additionally, the boarding manager server 110 may transmit a message to the boarding gate terminal device 130 indicating an alert, (e.g., "slow boarding") to the transit staff located at the gate.

In an additional embodiment, the boarding manager server 110 may periodically receive the location of a passenger from the passenger's user terminal 120 and may use this location to calculate the time for the passenger to walk to the boarding gate. The boarding manager may determine the time a passenger needs to start walking to arrive at the gate on time. The boarding manager server 110 may then transmit this time to the passenger's user terminal 120. Optionally, the boarding manager server 110 may send a more advanced alert than only the time itself (e.g., "leave in 5 minutes to arrive at the gate in time"). Additionally, the boarding manager server 110 may incorporate any available information that may influence the calculation (e.g., information of a walking impairment).

In an additional embodiment, at a periodic interval during the boarding process, the boarding manager server 110 may send the list of passengers that remain on the awaiting arrival list to the to the boarding gate terminal device 130. The list may additionally include an anticipated walk time to the gate for each passenger.

In an additional embodiment, prior to a passenger's arrival at the gate, the passenger and transit staff may communicate via the user terminal 120 and the boarding gate terminal device 130, respectively. For example, a passenger may communicate that they are in the security line, parking their car, or delayed in traffic. Alternatively, transit staff may request the status of the passenger by sending a signal to the passenger's user terminal 120. This communication link between the transit staff and the passenger may allow the transit staff to delay the departure of the transit vehicle to accommodate a late passenger. Additionally, the communication link may allow the transit staff to board other passengers in front of an arriving passenger when the arriving passenger is anticipated to miss their scheduled arrival TAG. For example, if a passenger with a TAG in 5 minutes is still parking, the transit staff may estimate that it will take them 20 minutes to arrive. In this situation, the transit staff may board passengers with a later scheduled TAG during the late passenger's time slot.

The system 100 may involve a number of different message types. There may be a passenger identity message (one time, at setup) from the user terminal 120 to the boarding manager server 110. There may be an "additional passengers" (e.g., children) message (once for each trip) from the user terminal 120 to the boarding manager server 110. There may be a passenger location message (periodically sent prior to boarding, e.g., once per minute) sent from the user terminal 120 to the boarding manager server 110. The passenger location may be derived from a positioning functionality associated with the user terminal, such as a Global Positioning System within a smartphone. There may be a Wi-Fi network detected message from the user terminal 120 to the boarding manager server 110. There may be a pre-trip information message from the boarding gate terminal device 130 to the boarding manager server 110. The pre-trip information message may include a boarding list in order for each passenger, or a boarding list with a priority number for each passenger (e.g., boarding zone 1), which the boarding manager server 110 may then sort.

It will be apparent to those skilled in the art that various modifications may be made in the present disclosure, without departing from the spirit or scope of the disclosure. Thus, it is intended that the present disclosure cover the modifications and variations of this disclosure provided they come within the scope of the appended claims and their equivalents.

What is claimed is:

1. A method, comprising the steps of:
   receiving boarding information from a plurality of passengers and a transit staff;
   calculating an arrival time to request each of the plurality of passengers to arrive at a boarding gate, wherein the arrival time is based on the boarding information;
   transmitting a message to a user terminal associated with each passenger, wherein the message includes the arrival time;
   wherein immediately following the arrival time for an individual passenger, the method further comprises the steps of:
   marking the individual passenger as overdue when the individual passenger remains on an awaiting arrival list; and
   when a passenger is marked as overdue, either transmitting an alert message to a user terminal associated with the overdue passenger or transmitting an alert message to a boarding gate terminal.

2. The method of claim 1, wherein the boarding information includes initial setup information, upcoming trip information, and pre-trip information.

3. The method of claim 1, wherein the arrival time is calculated as a proposed boarding time for each passenger minus a predefined constant, and
   wherein the proposed boarding time for the individual passenger is based on:
   a time required to board all passengers listed to board prior to the individual passenger, and
   a start of boarding time for all the plurality of passengers.

4. The method of claim 1, further comprising the steps of:
   estimating an anticipated last-passenger arrival time; and
   transmitting the anticipated last-passenger arrival time to a boarding gate terminal.

5. The method of claim 1, further comprising the steps of:
   receiving an indication when a passenger has physically arrived at the boarding gate; and
   removing the physically arrived passenger from the awaiting arrival list.

6. The method of claim 5, wherein immediately following the arrival time for the individual passenger, the method further comprises the steps of:
   recalculating the arrival time for each passenger on the awaiting arrival list; and
   transmitting the recalculated arrival time to each passenger on the awaiting arrival list.

7. The method of claim 4, wherein immediately following the arrival time for the individual passenger, the method further comprises the steps of:
   re-estimating the anticipated last-passenger arrival time; and
   transmitting the re-estimated anticipated last-passenger arrival time to the boarding gate terminal.

8. The method of claim 6, further comprising the steps of:
   determining whether the recalculated arrival time exceeds a predetermined threshold for any of the passengers on the awaiting arrival list; and
   when the predetermined threshold has been exceeded for a particular passenger, transmitting an alert to the user terminal associated with the particular passenger.

9. The method of claim 7, further comprising the steps of:
   determining whether the re-estimated anticipated last-passenger arrival time exceeds a predetermined threshold; and
   when the predetermined threshold has been exceeded, transmitting an alert to the boarding gate terminal.

10. A system, comprising a boarding manager device, wherein the boarding manager device:
    receives hoarding information from a plurality of passengers and a transit staff;
    calculates an arrival time to request each of the plurality of passengers to arrive at a boarding gate, wherein the arrival time is based on the boarding information;
    transmits a message to a user terminal associated with each passenger, wherein the message includes the arrival time;
    wherein immediately following the arrival time for an individual passenger, the boarding manager device further:
    marks the individual passenger as overdue when the individual passenger remains on an awaiting arrival list; and
    when a passenger is marked as overdue, either transmits an alert message to a user terminal associated with the overdue passenger or transmits an alert message to a boarding gate terminal.

11. The system of claim 10, wherein the boarding in loll cation includes initial setup information, upcoming trip information, and pre-trip information.

12. The system of claim 10, wherein the arrival time is calculated as a proposed boarding time for each passenger minus a predefined constant, and
    wherein the proposed boarding time for the individual passenger is based on:
    a time required to board all passengers listed to board prior to the individual passenger, and
    a start of boarding time for all the plurality of passengers.

13. The system of claim 10, wherein the boarding manager device further:
  estimates an anticipated last-passenger arrival time; and
  transmits the anticipated last-passenger arrival time to a boarding gate terminal.

14. The system of claim 10, wherein the boarding manager device further:
  receives an indication when a passenger has physically arrived at the boarding gate; and
  removes the physically arrived passenger from the awaiting arrival list.

15. The system of claim 14, wherein immediately following the arrival time for the individual passenger, the boarding manager device further:
  recalculates the arrival time for each passenger on the awaiting arrival list; and
  transmits the recalculated arrival time to each passenger on the awaiting arrival list.

16. The system of claim 13, wherein immediately following the arrival time for the individual passenger, the boarding manager device further:
  re-estimates the anticipated last-passenger arrival time; and
  transmits the re-estimated anticipated last-passenger arrival time to the boarding gate terminal.

17. The system of claim 15, wherein the boarding manager device further:
  determines whether the recalculated arrival time exceeds a predetermined threshold for any of the passengers on the awaiting arrival list; and
  when the predetermined threshold has been exceeded for a particular passenger, transmits an alert to the user terminal associated with that particular passenger.

18. A method, comprising the steps of:
  receiving boarding information from a user;
  transmitting the boarding information to a boarding manager device,
    wherein the boarding manager device calculates an arrival time to request a plurality of passengers to arrive at a boarding gate,
    wherein the plurality of passengers includes the user, and
    wherein the arrival time is based on boarding information obtained from the plurality of passengers;
  receiving a message from the boarding manager device, wherein the message includes the arrival time for the user;
  wherein immediately following the arrival time for the user, the boarding manager marks the user as overdue when the user remains on an awaiting arrival list; and
  when the user is marked as overdue, receiving an alert message.

19. The method of claim 1, further comprising:
  estimating the number of passengers in the process of boarding; and
  when the number of passengers in the process of boarding exceeds a threshold, increasing the arrival time for each passenger that has not arrived at the boarding gate.

20. The method of claim 1, further comprising:
  receiving the location of each passenger from each user terminal;
  calculating a walking time required for each passenger to walk to the boarding gate;
  determining a leaving time for each passenger to start walking to arrive at the gate on time; and
  transmitting the leaving time to the user terminal associated with each passenger.

21. The method of claim 1, further comprising:
  establishing a communication link between the user terminal associated with each passenger and the transit staff,
    wherein the communication link enables the user terminal to selectively transmit the passenger location to the transit staff, and
    wherein the communication link enables the transit staff to selectively request a location of a specified passenger from a user terminal associated with the specified passenger.

* * * * *

UNITED STATES PATENT AND TRADEMARK OFFICE
CERTIFICATE OF CORRECTION

| | |
|---|---|
| PATENT NO. | : 10,356,548 B2 |
| APPLICATION NO. | : 15/373705 |
| DATED | : July 16, 2019 |
| INVENTOR(S) | : Brukman |

It is certified that error appears in the above-identified patent and that said Letters Patent is hereby corrected as shown below:

In the Claims

Claim 11, Column 10 Lines: 56 and 57:
"11. The system of claim 10, wherein the boarding in loll cation includes initial setup information, upcoming trip"
Should read:
"11. The system of claim 10, wherein the boarding information includes initial setup information, upcoming trip"

Signed and Sealed this
Twenty-eighth Day of April, 2020

Andrei Iancu
*Director of the United States Patent and Trademark Office*